US007126302B2

(12) United States Patent
Vrielink

(10) Patent No.: US 7,126,302 B2
(45) Date of Patent: Oct. 24, 2006

(54) MODULAR MOTOR CONVERTER FOR WINDOW COVERING SYSTEMS

(76) Inventor: Gerrit Jan Vrielink, 1700 N. Cheyenne Dr., Richardson, TX (US) 75080

( * ) Notice: Subject to any disclaimer, the term of this patent is extended or adjusted under 35 U.S.C. 154(b) by 0 days.

(21) Appl. No.: 10/958,313

(22) Filed: Oct. 5, 2004

(65) Prior Publication Data

US 2006/0071619 A1 Apr. 6, 2006

(51) Int. Cl.
*H04Q 7/00* (2006.01)
*H02P 1/00* (2006.01)

(52) U.S. Cl. ...................... 318/466; 318/280; 318/445; 318/446; 318/16

(58) Field of Classification Search ........ 318/281–282, 318/16–17, 445, 293, 466–469, 264–267
See application file for complete search history.

(56) References Cited

U.S. PATENT DOCUMENTS 6,497,267 B1 * 12/2002 Azar et al. .................. 160/310
6,867,970 B1 * 3/2005 Muller et al. ............... 361/695
2001/0036098 A1 * 11/2001 Larikka ...................... 363/157
2001/0050538 A1 * 12/2001 Kovach et al. ............... 318/16
2002/0158595 A1 * 10/2002 Osinga et al. .............. 318/445
2004/0155614 A1 * 8/2004 Osinga et al. .............. 318/280
2004/0169490 A1 * 9/2004 Heurtault .................... 320/114
2004/0223301 A1 * 11/2004 Muller et al. ............... 361/699

* cited by examiner

*Primary Examiner*—Paul Ip
(74) *Attorney, Agent, or Firm*—Carr LLP

(57) ABSTRACT

A window covering system includes a window covering, a motor having a housing and a power supply inlet, for opening or closing the window coverings, and a modular motor converter. The modular motor converter includes a low voltage interface for functional attachment to the motor, a housing for the low voltage interface, a standard motor power supply connector incorporated into the housing and fitting into the motor power supply inlet, and at least one attachment arm, preferably two, that clips onto the motor housing and permits quick clip-on and removal from the motor. In one form, the modular motor converter further includes a remote radio frequency control for functional attachment to and control of the motor. The modular motor converter also includes means for pre-setting silent stop of the motor end positions. The housing permits external access to motor dip switches.

18 Claims, 4 Drawing Sheets

FIG. 2
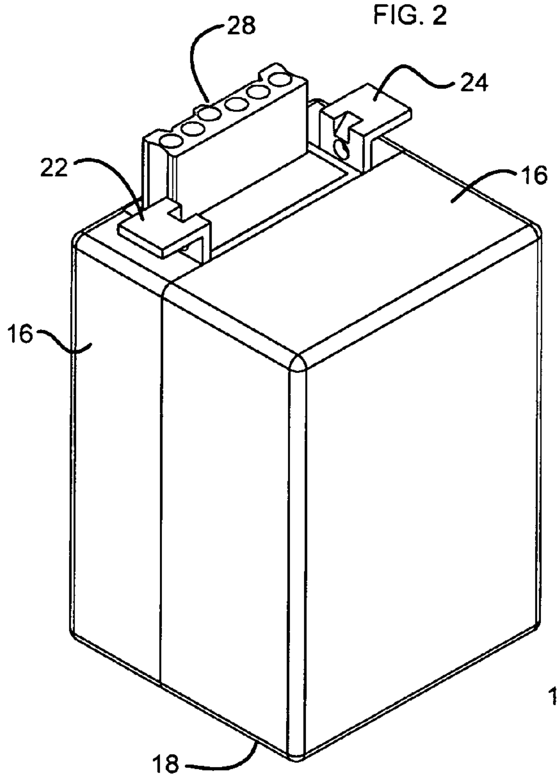
FIG. 3
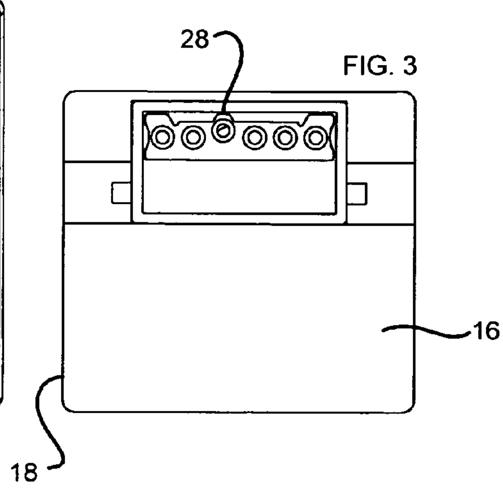
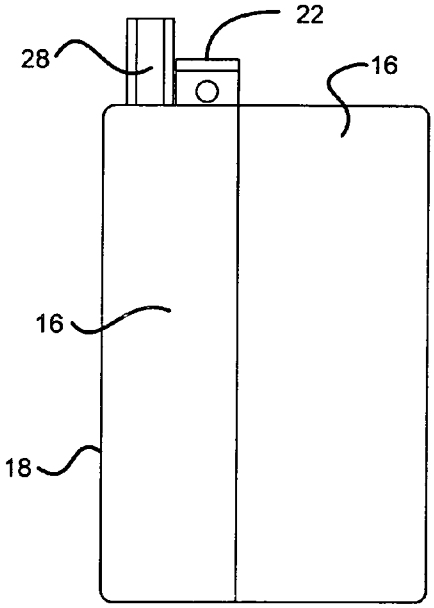
FIG. 4
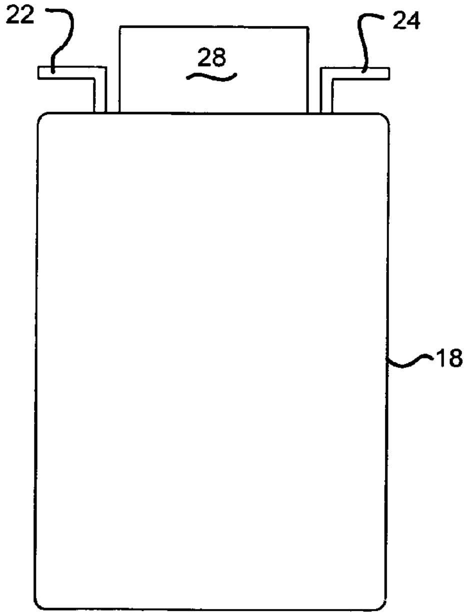
FIG. 5

MODULAR MOTOR CONVERTER FOR WINDOW COVERING SYSTEMS

CROSS-REFERENCE TO RELATED APPLICATIONS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention pertains to the use of electric motors to operate window coverings systems for draperies, blinds, shades and the like, and specifically to the ability to convert AC-powered motors by means of a plug-in and detachable modular device to DC switching and/or to radio frequency-controlled remote switching.

2. Description of Related Art

Motorized window coverings systems are traditionally driven by AC motors powered by 120V/60 Hz power line supply or in some instances, by 240 V power line supply. In their most simple form they are switched on and off by means of manually operated, hardwired, line voltage switches. In addition there are also low voltage DC motors operating on 12 to 24 Volts DC. These are traditionally switched on and off by means of hardwired DC switches. As a rule, the DC motors are less powerful than the AC motors, and therefore can only handle smaller loads, which translates into smaller sized window coverings.

Roller and lift systems for shades, blinds and the like commonly use tubular motors to power their operation. Such motors are typically mounted inside the rolling mechanism. By contrast, traversing systems (those moving in horizontal or inclined direction) for draperies, vertical blinds and the like commonly use motors which are externally attached to the mechanical parts such as headrails, etc. Those motors are usually configured in a predominantly square or rectangular box-like shape.

Operation of line voltage (AC) motors by means of a connection with a radio or infrared receiver or by means of adding a low voltage switching device has commonly ben accomplished by wire connection with external receiver units. This requires substantial on-site wiring and creates aesthetic problems, especially in interior environments. In addition to wiring problems, such separate, external devices are bulky and expensive as a rule. The modular motor converter invention with its plug-in features can eliminate these disadvantages.

More recently, motors of both types have been developed to incorporate built-in modifiers such as low voltage converters to permit low voltage switching of AC-powered motors. However, by integrating this feature into the motors, it is no longer possible to switch such motors by means of line voltage switching devices. The option of using specific line voltage equipment to switch such low voltage switched motors has effectively been eliminated.

An additional recent development has been the introduction of motors with integrated electronic and radio frequency (RF) switching. Built-in electronic switching is most commonly accomplished by sending electronic signals to the PC board and processor embedded in the motor. Such electronic processors also may be programmed to set the end position stops of the motor. In the alternative, they may be equipped with current-sensing which measures the increased current draw when a drapery or blind is blocked in its movement upon reaching its fully open or closed position. The blockage point is normally reached under full operating speed, thus is also known as the impact stop. Impact stops typically are associated with an increased noise level of operation and, in the case of draperies, with the risk of somewhat inaccurate stacking points due to drapery backflow.

BRIEF SUMMARY OF THE INVENTION

The current invention includes a modular motor converter that can be instantly attached to the motor, unifying it into one integrated unit. The modular motor converter offers several significant operational and economic advantages while simultaneously incorporating the new developments such as the low voltage switching in the modular motor converter/low voltage interface and such as the remote radio control in the modular motor converter/radio frequency control.

The modular motor converter housing forms a compact, square design constructed of UL-certified ABS material. The housing is dimensioned such that it matches the motor contour, and when attached, converts the assembly into one contiguous unit. The housing is provided with two small attachment arms that clip onto the motor housing and permit quick clip-on or removal. The standard motor power supply connector is incorporated into the housing and fits into the motor power supply inlet exactly as a standard power supply connector would. This provides versatility because the motor can be used by itself, i.e. without the modular motor converter, for traditional power supply along with the available market line voltage control and operating devices or, alternatively, the motor with the modular motor converter attached can be used for low voltage or radio frequency control remote switching.

The modular motor converter invention offers both flexibility and a significant economic advantage over the practice of incorporating radio frequency control and low voltage interface capabilities inside each motor. The latter drives up the price of the motor. However, not all applications require or desire these features. And as a rule, the costs for them are passed on to the end user whether these features are desired or not. Thus a product results which often costs more than it should. The modular motor converter concept makes it possible to incorporate the low voltage interface/radio frequency control features when the customer desires it, but keeps the basic product available for the instances in which line voltage operation is required or preferred. The modular concept also permits offering in the modular motor converter/low voltage interface either the low voltage interface function only, or the combination of low voltage interface with radio frequency control with the modular motor converter/radio frequency control. This makes it possible to keep the costs of the product in line with the actual requirements of the application.

This invention creates important economic advantages in manufacturing costs. First, it is possible to stay with a single standard motor. Secondly it results in savings in inventory at all stocking and distribution levels. And finally it provides a more competitively priced and more versatile product.

Motors with built-in low voltage controls which are provided with the current-sensing impact stops do not offer the ability to pre-set end stops which are silent, although silent end stops are a highly desirable feature. The modular motor converter invention makes it possible to combine the advantages of the pre-set silent stop of the motor end positions with the low voltage switching feature. The modular motor converter/radio frequency control further makes it possible to remotely operate and stop the system without losing the important silent stop feature of the AC motors.

An additional advantage of the modular motor converter invention derives from the externally accessible dip switches that permit instant reversal of the running direction of the motor. A common error during the on-site installation of motorized window covering systems is the reversal of the directional wires when they are being connected. This will cause the system to travel in the direction opposite to that which was intended. In most situations this will require wires to be disconnected and reconnected. The modular motor converter invention permits the rotation and travel direction to be instantly switched by simply adjusting the appropriate dip switch.

An additional advantage of the modular motor converter invention is the ability to set the control module for either momentary switching, which permits accurate pulse positioning of the drapery or blind system to precisely reach the desired amount of closing or alternatively, to set the switches to change from pulse to maintain, so that a simple one-second switch or press signal will be latched in and ensure that the system travels its full open or closing distance until it is turned off by its silent stop feature.

The color-coordinated housing snap-locks onto the motor housing and can easily be removed. This permits conversion back to standard line voltage AC power supply if so desired.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 2 is a perspective view of a control module according to the present invention for the modular motor converter;

FIG. 3 is a top view of a control module according to the present invention for the modular motor converter;

FIG. 4 is a left side view of a control module according to the present invention for the modular motor converter;

FIG. 5 is a front view of a control module according to the present invention for the modular motor converter;

DETAILED DESCRIPTION OF THE INVENTION

Figure 1:
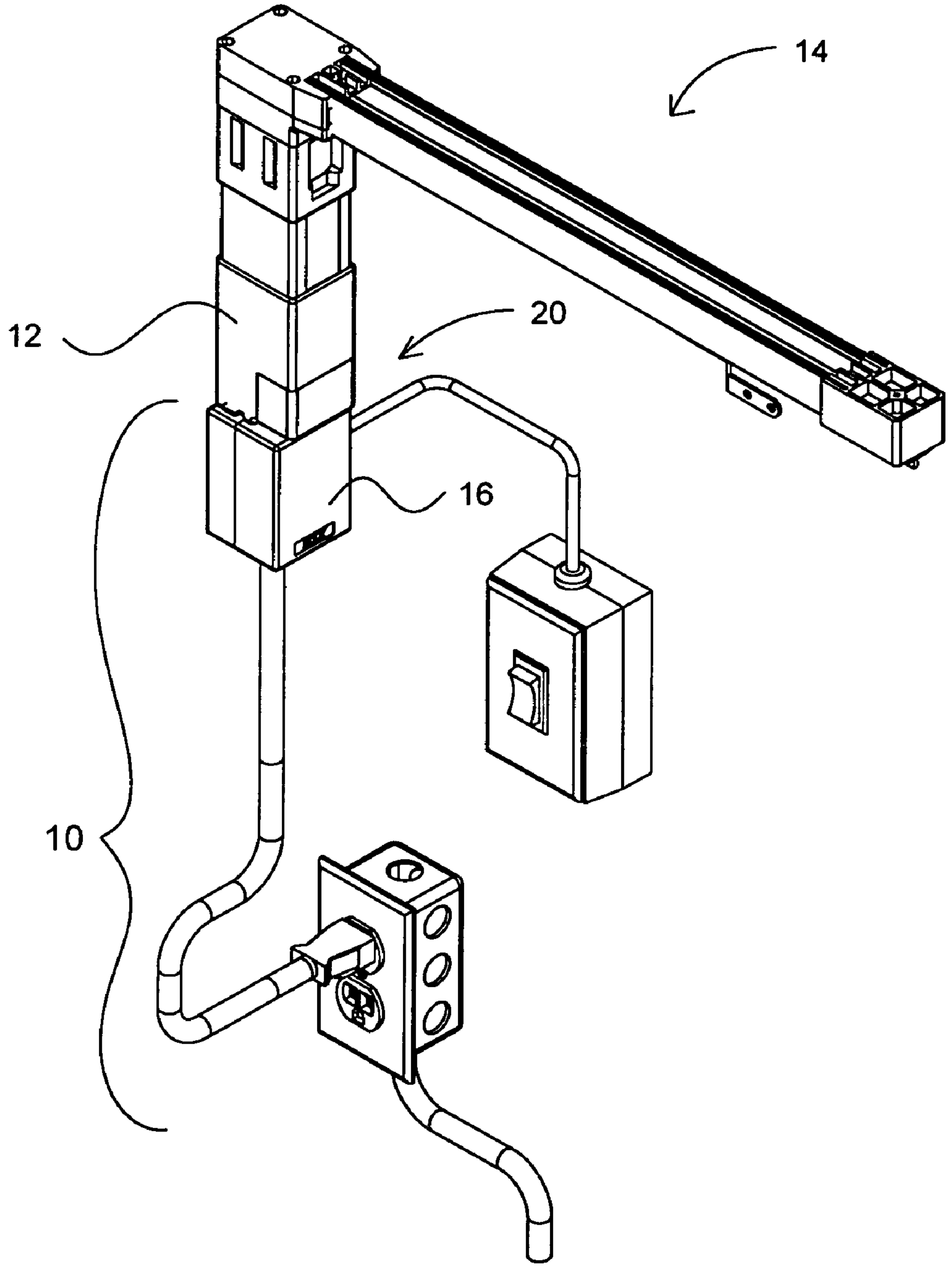
FIG. 1 is a perspective view of a modular motor converter according to the present invention with a motor installed, attached to a window covering system.
Figure 6:
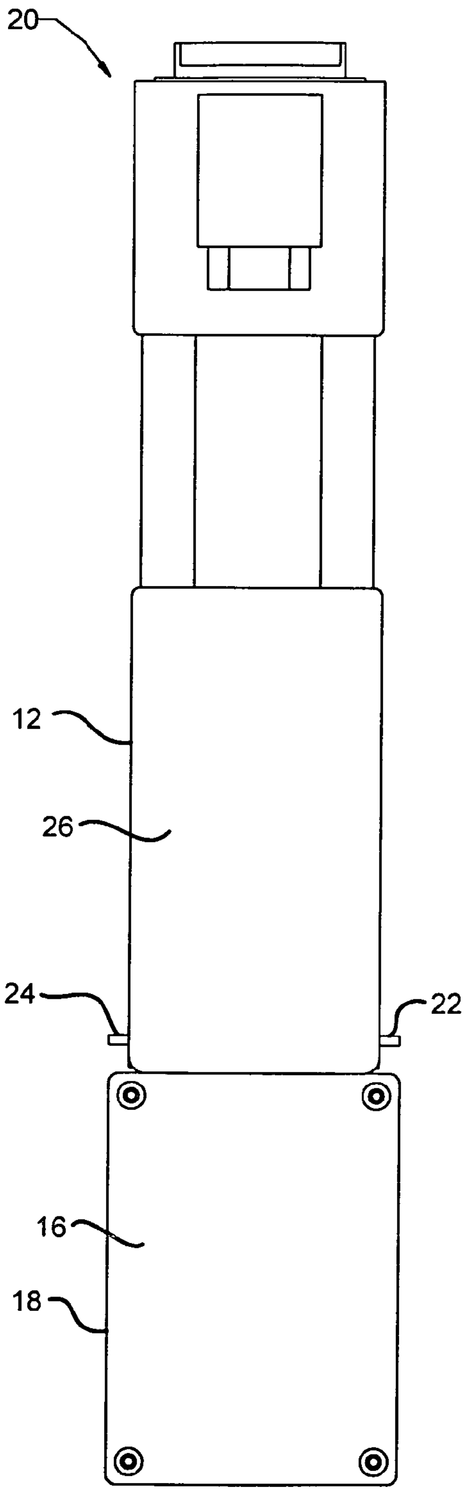
FIG. 6 is a rear view of a modular motor converter according to the present invention with a motor installed.
Figure 7:
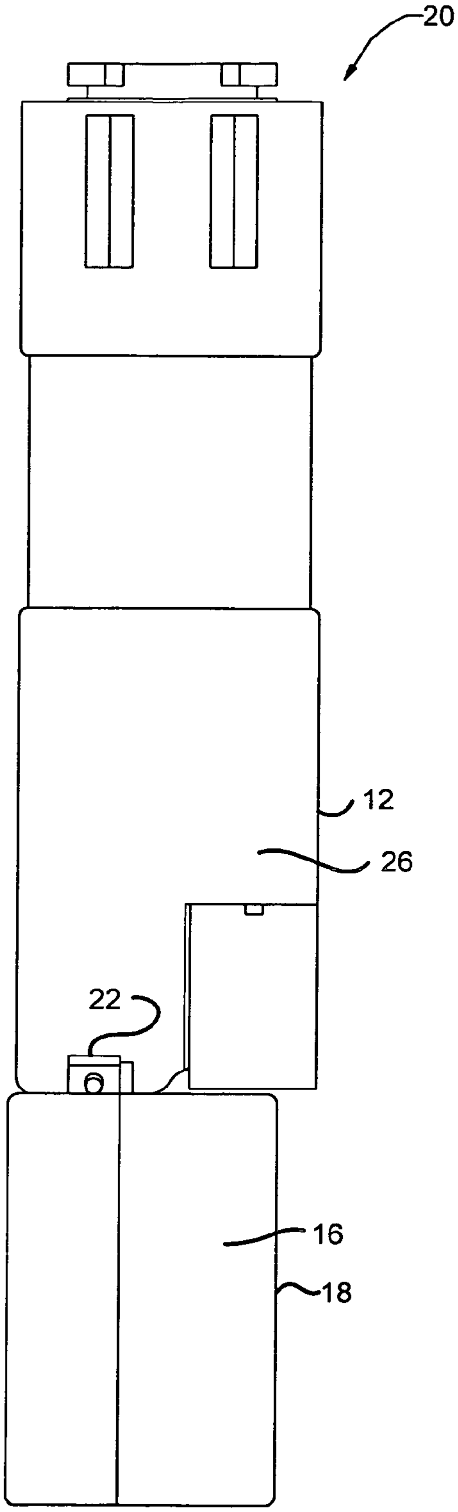
FIG. 7 is a left side view of a modular motor converter according to the present invention with a motor installed.

Referring now to the drawing, and in particular to FIG. 1, the current invention includes a modular motor converter 10 that can be instantly attached to a motor 12, unifying it into one integrated unit 20 as part of a window covering system 14. The modular motor converter offers several significant operational and economic advantages while simultaneously incorporating the new developments such as low voltage switching in the modular motor converter/low voltage interface and such as the remote radio control in the modular motor converter/radio frequency control.

Referring also to FIG. 2–7, a housing 16 for a control module 18 of the modular motor converter forms a compact, square design constructed of UL-certified ABS material. The housing is dimensioned such that it matches the motor contour, and when attached, converts the assembly into one contiguous unit 20. The housing is provided with two small attachment arms 22 and 24 that clip onto the motor housing 26 and permit quick clip-on or removal. The standard motor power supply connector 28 is incorporated into the control module housing and fits into the motor power supply inlet exactly as a standard power supply connector would. This provides versatility because the motor can be used by itself, i.e. without the modular motor converter, for traditional power supply along with the available market line voltage control and operating devices or, alternatively, the motor with the modular motor converter attached can be used for low voltage or radio frequency control remote switching.

Figure 8:
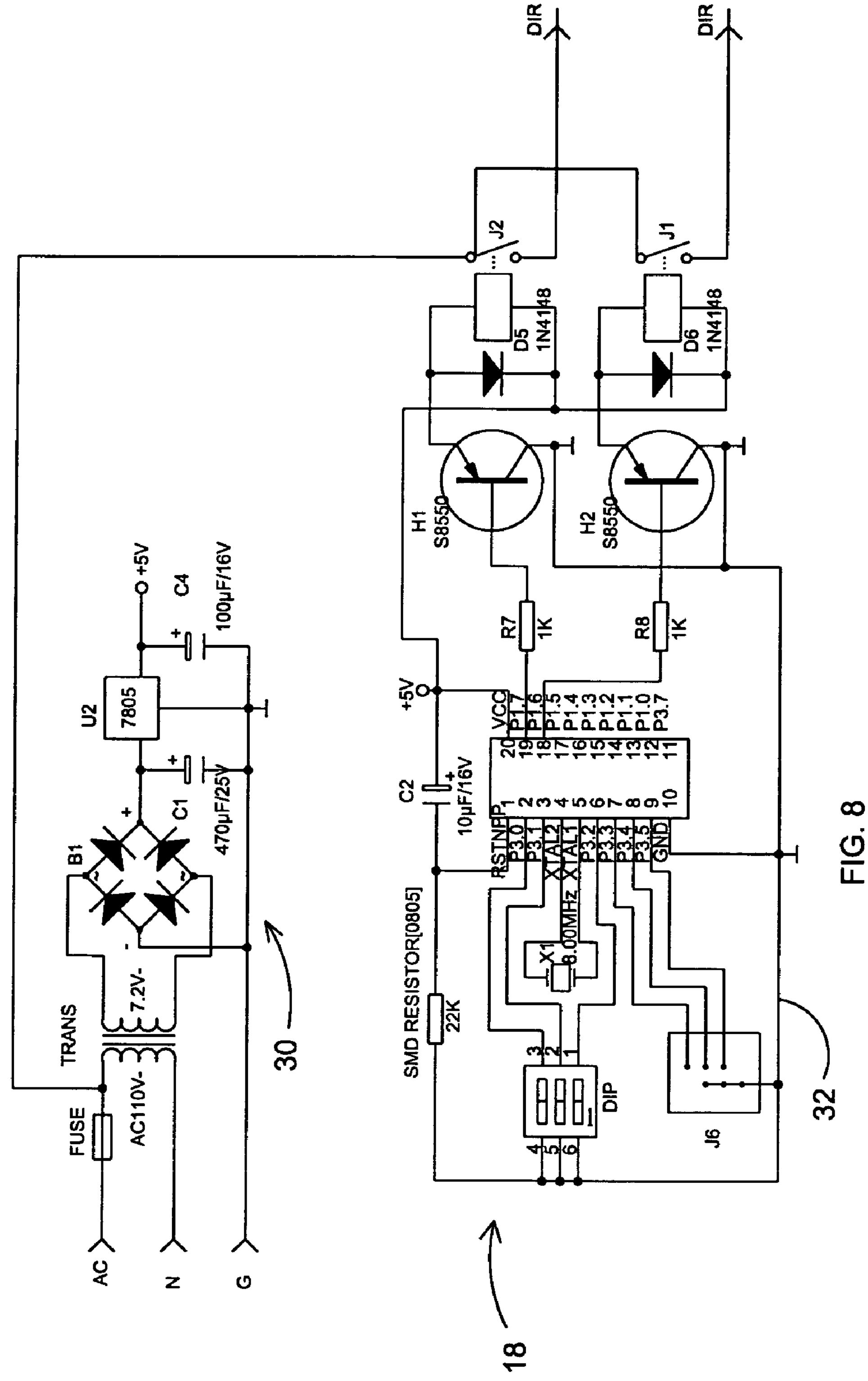
FIG. 8 is an electrical diagram of a control module for the modular motor converter according to the present invention.

Referring also to FIG. 8, the modular motor converter of the present invention offers both flexibility and a significant economic advantage over the practice of incorporating radio frequency control and low voltage interface capabilities inside each motor. The latter drives up the price of the motor. However, not all applications require or desire these features. And as a rule, the costs for them are passed on to the end user whether these features are desired or not. Thus a product results which often costs more than it should. The modular motor converter concept makes it possible to incorporate the low voltage interface 30/radio frequency control 32 features when the customer desires it, but keeps the basic product available for the instances in which line voltage operation is required or preferred. The modular concept also permits offering in the modular motor converter/low voltage interface either the low voltage interface function only, or the combination of low voltage interface with radio frequency control with the modular motor converter/radio frequency control. This makes it possible to keep the costs of the product in line with the actual requirements of the application.

This invention creates important economic advantages in manufacturing costs. First, it is possible to stay with a single standard motor. Secondly it results in savings in inventory at all stocking and distribution levels. And finally it provides a more competitively priced and more versatile product.

Motors with built-in low voltage controls which are provided with the current-sensing impact stops do not offer the ability to pre-set end stops which are silent, although silent end stops are a highly desirable feature. The modular motor converter invention makes it possible to combine the advantages of the pre-set silent stop of the motor end positions with the low voltage switching feature. The modular motor converter/radio frequency control further makes it possible to remotely operate and stop the system without losing the important silent stop feature of the AC motors.

An additional advantage of the modular motor converter invention derives from the externally accessible dip switches that permit instant reversal of the running direction of the motor. A common error during the on-site installation of motorized window covering systems is the reversal of the directional wires when they are being connected. This will cause the system to travel in the direction opposite to that which was intended. In most situations this will require wires to be disconnected and reconnected. The modular motor converter invention permits the rotation and travel direction to be instantly switched by simply adjusting the appropriate dip switch.

An additional advantage of the modular motor converter invention is the ability to set the control module for either momentary switching, which permits accurate pulse positioning of the drapery or blind system to precisely reach the desired amount of closing or alternatively, to set the switches to change from pulse to maintain, so that a simple one-second switch or press signal will be latched in and ensure that the system travels its full open or closing distance until it is turned off by its silent stop feature.

The color-coordinated housing snap-locks onto the motor housing and can easily be removed. This permits conversion back to standard line voltage AC power supply if so desired.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A modular motor converter for a motor of a window covering system, the motor being adapted for use with conventional alternating current power and having a motor housing and a power receptacle for operable connection of the motor to an external source of conventional alternating current power, the modular motor converter comprising:

- a converter housing removably attachable to said motor housing, said converter housing including a plug connectible to said power receptacle of said motor;
- a low voltage powered control interface disposed within said converter housing and having at least one low voltage-controlled switch for controllably connecting said external source of conventional alternating current power to said motor to permit forward and reverse operation of said motor, said control interface further having a power cord, including multiple conductors, extending from the interface for connection to an external source of conventional alternating current power; and
- at least one retention device for removably securing said converter housing to said motor housing.

2. The modular motor converter of claim 1, further including a radio frequency receiver-controller disposed within said controller housing and operably connected to said low voltage controlled switch for permitting remote control of said switch by means of a remote radio frequency transmitter-controller.

3. The modular motor converter of claim 1, wherein the control interface further includes externally accessible dip switches for reversing the running direction of the motor to correct, if necessary, incorrect directional on-site wiring.

4. The modular motor converter of claim 1, wherein said conductors form part of a conventional alternating current power cord having a plug adapted for connection to a conventional wall outlet.

5. The modular motor converter of claim 1, wherein said converter housing has an external shape similar to said motor housing.

6. The modular motor converter of claim 1, wherein the retention device is a clippable attachment device.

7. The modular motor converter of claim 6, wherein the clippable attachment device includes at least one resilient attachment arm.

8. The modular motor converter of claim 6, wherein the clippable attachment device includes at least two resilient attachment arms.

9. The modular motor converter of claim 1, wherein the motor further includes means for pre-setting a silent stop end position.

10. An electric motor driven window covering system, comprising:

- a window covering;
- a motor adapted for use with conventional alternating current power, a motor housing and a power supply inlet adapted for operable connection to an external source of conventional alternating current; and
- a modular motor converter having:
  - a converter housing removably attachable to said motor housing, said converter housing including a plug connectible to said power receptacle of said motor;
  - a low voltage powered control interface disposed within said converter housing and having at least one low voltage-controlled switch for controllably connecting said external source of conventional alternating current power to said motor to permit forward and reverse operation of said motor, said control interface further having a power cord, including multiple conductors, extending from the interface for connection to an external source of conventional alternating current power; and
  - at least one retention device for removably securing said converter housing to said motor housing.

11. The electric motor driven window covering system defined in claim 10, wherein said modular motor converter further includes a radio frequency receiver-controller disposed within said controller housing and operably connected to said low voltage controlled switch for permitting remote control of said switch by means of a remote radio frequency transmitter-controller.

12. The electric motor driven window covering system defined in claim 10, wherein the control interface further includes externally accessible dip switches for reversing the running direction of the motor to correct, if necessary, incorrect directional on-site wiring.

13. The electric motor driven window covering system defined in claim 10, wherein said conductors form part of a conventional alternating current power cord having a plug adapted for connection to a conventional wall outlet.

14. The electric motor driven window covering system defined in claim 10, wherein said converter housing has an external shape similar to said motor housing.

15. The electric motor driven window covering system defined in claim 10, wherein said retention device is a clippable attachment device.

16. The electric motor driven window covering system defined in claim 15, wherein the clippable attachment device includes at least one resilient attachment arm.

17. The electric motor driven window covering system defined in claim 15, wherein the clippable attachment device includes at least two resilient attachment arms.

18. The electric motor driven window covering system defined in claim 10, wherein said motor further includes means for pre-setting a silent stop end position.

* * * * *